Figure 1:
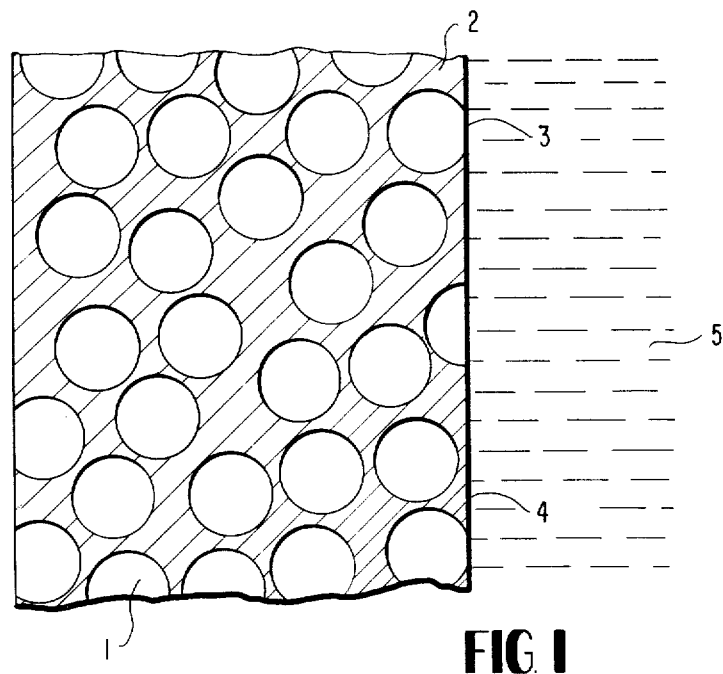

United States Patent [19]
Haschka et al.

[11] 3,881,960
[45] May 6, 1975

[54] ELECTRODE FOR GALVANIC CELLS

[75] Inventors: Friedrich Haschka; Rolf Linkohr, both of Stuttgart; Heinz G. Plust, Neuhausen, all of Germany

[73] Assignee: Deutsche Automobilgesellschaft mbH

[22] Filed: Feb. 19, 1974

[21] Appl. No.: 443,194

[30] Foreign Application Priority Data
Feb. 17, 1973 Germany.......................... 2307851

[52] U.S. Cl. .......................................... 136/120 FC
[51] Int. Cl. .......................................... H01m 27/04
[58] Field of Search........ 136/120 FC, 120 R, 86 D; 204/280, 290, 291

[56] References Cited
UNITED STATES PATENTS
3,423,248  1/1969  Plust.............................. 136/120 FC Primary Examiner—Anthony Skapars
Attorney, Agent, or Firm—Craig & Antonelli

[57] ABSTRACT

A hydrogen storage electrode having a body portion formed of particles of an active, hydrogen-storing material, which particles are enveloped by and in surface contact with $TiNi_3$. This electrode may be formed by admixing the $TiNi_3$ in powdered form with the active material in powder form and thereafter press-molding the mixture and/or sintering the mixture.

17 Claims, 2 Drawing Figures

ELECTRODE FOR GALVANIC CELLS

The present invention relates to hydrogen storage electrodes for galvanic cells, a process for the production of the hydrogen storage electrodes and the use of such electrodes in galvanic cells with preferably alkaline electrolytes.

The construction of hydrogen storage electrodes, the manufacture thereof and the use thereof in galvanic cells with an alkaline electrolyte has been described in various disclosures (i.e. DAS 1,118,843, 1,183,149 DOS [German Unexamined Laid-Open Application] 1,771,239, E. W. Justi, H. M. Ewe, A. W. Kalberlah, N. M. Saridakis, "Electrocatalysis in the Nickel-Titanium System" *Energy Conv.* 10, 183–187 (1970), as well as in DOS 1,905,453). Generally, Raney nickel or Ti-Ni alloys are utilized in these electrodes as the active hydrogen-storing components. Recently, La-Co and La-Ni alloys have also been suggested as suitable materials for hydrogen storage in VDI-Z, a Periodical of the German Engineers' Society 114, (11), 790–791 (1972).

The last mentioned titanium and lanthanum alloys are particularly advantageous in theory, since these alloys can, in part, incorporate hydrogen to a high extent at interstitial locations. However, these alloys have grave disadvantages, as will be elaborated on below.

Experiments with electrodes of titanium-nickel alloys have shown that satisfactory hydrogen storage electrodes having a high capacity (> 150 to 200 amp.hr./kg.) are obtained by the use of titanium-rich nickel alloys and particularly of the intermetallic compounds $Ti_2Ni$ as well as those having up to a nickel content found in TiNi compounds, are used as the active material. Phases of greater nickel enrichment have unusable storage capacities, for example, the compound $Ni_3Ti$, which has no storage capacity for hydrogen (H. M. Ewe, "Electrochemical Storage and Oxidation of Hydrogen with Titanium-Nickel Alloys", thesis 1970, Technical College Braunschweig). Therefore, the $Ni_3T$ compounds are heretofore not utilized for the construction of storage electrodes, and care is also taken during the manufacturing process that such compounds are not formed by metallurgical processes, etc.

Although hydrogen storage electrodes containing the nickel compounds more enriched in titanium as the active components yield good amperes-hour per kilogram values, the practical use of these electrodes is considerably impaired by the corrosion which occurs. The corrosion resides in that, on the one hand, the incorporation and extraction of the hydrogen during the operation of the electrode results in a change in volume of the electrode which—measured in one direction—is 3 to 4 percent, and that, on the other hand, even in the uncharged case, an electrochemical corrosion process takes place. Both corrosion processes accelerate the crack formation, and consequently, the active material of the electrode is lost by disintegration. Additionally, an increasing amount of titanium and nickel is found dissolved in the electrolyte.

With an increasing number of charging and discharging cycles, the electrode surface is constantly enlarged by the crack formation, and the tensile strength of the initially already brittle material is correspondingly reduced. In spite of an increasing surface area, however, the polarization of the electrode increases, since the newly formed surfaces are rapidly covered by an oxide layer during the course of the electro-chemical corrosion. A reduction in current load, lower amp.hr./kg. values, and a shortened lifetime of the electrode are the consequences.

Processes have been known which diminish the aforementioned disadvantages. On the one hand, attempts were made to produce electrodes of an active material of the alloy, having a porosity of almost zero. This, at first sight, reduces the internal surface and thus correspondingly also the extent of the corrosion. However, the change in volume occurring as a consequence of the hydrogen absorption of the electrode and consequent hydride formation also rapidly resulted in destruction also in case of these compact electrodes.

On the other hand, it has been suggested to produce the electrode by thermoforming (hot pressing) a mixture of the active alloy material and nickel powder. Since the ductile Ni grains are statistically present among the grains of active material, the tensions occurring due to volume change in the entire electrode are attenuated. Since a stabilization can only be attained by the admixture of considerable amounts of nickel, the capacity of the electrode is accordingly very strongly diminished, which greatly impairs its technical applicability. Another possibility for reducing the corrosion caused by the volume change of the electrode finally resides in effecting a suitable doping of the active material, as a consequence of which the change in the volume is reduced.

None of these measures resulted in a satisfactory solution of the corrosion problem inherent in Ni/Ti/H-storage electrodes having a high titanium content.

It is one object of this invention to provide a process for making an apparatus for utilizing a hydrogen storage electrode which results in electrodes having a high amp. hr./kg. value, exhibiting a large current load capacity, and a long life and which show little susceptibility to corrosion.

Starting with conventional processes, one object of the present invention is solved by coating the internal and external surfaces of the electrode with at least one layer of a metallic and hydrogen-permeable material and maintaining the internal and external surface areas in contact with each other; the material consisting especially of a Ti-Ni alloy of the composition $TiNi_3$.

The special solution of the problem resides in using $TiNi_3$ as an inactive material with high hydrogen permeation, either previously applied to the grains of a pulverulent active material of the hydrogen-storing Ti/Ni alloy, e.g. by vapor deposition or sputtering, etc. 2 grams of nickel on 35 grams of alloy and introduction by diffusion (at temperature range of 800°–900°C., and in a time period of 5–10 minutes), or in the form of a powder with a granular size of from 1 to 500$\mu$, preferably up to 80$\mu$, which powder is mixed with the active material of the Ti/Ni and is, for example, press-molded with the active material of the Ti/Ni and is, for example, press-molded or sintered.

Investigations have shown that a titanium-nickel alloy of the composition $TiNi_3$ has an extraordinarily high diffusion coefficient for hydrogen and does not corrode in an aqueous-alkaline medium. Another advantage of the $TiNi_3$ alloy resides in that it has a relatively minor solubility with respect to hydrogen. Accordingly, changes in density and, as a consequence thereof, mechanical disintegrations, do not occur.

Figure 2:
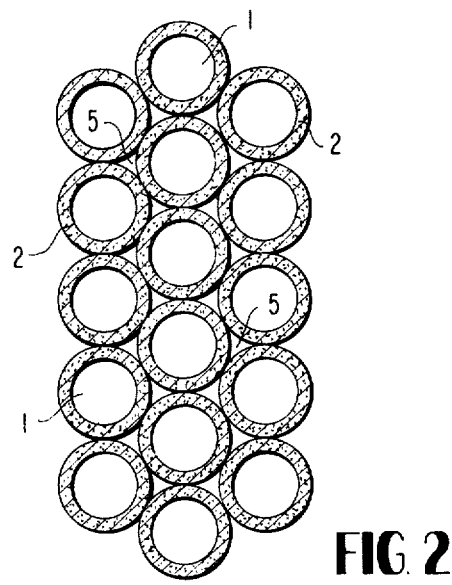

Due to these properties, the TiNi$_3$ alloy is quite especially suitable for the construction of the electrode according to this invention, the advantageous characteristics of which will be explained in greater detail in the following description and with reference to the accompanying drawings wherein:

FIG. 1 is a schematic view of an electrode of the invention within a galvanic cell; and FIG. 2 is a schematic view of another embodiment of the improved electrode of the invention.

In its simplest form, the electrode has the structure illustrated in the schematic view of FIG. 1. The electrode has a compact body obtained by filling the pores of a skeleton of active material 1 made of a titanium-nickel alloy such as Ti$_2$Ni, TiNi with TiNi$_3$, denoted by reference numeral 2. Since the hydrogen reaction according to H$^+$ + e$^-$ ⇌ H$_{Ad}$(Me) ⇌ H$_{dissolved}$ (Me) on TiNi$_3$ is not inhibited and the hydrogen diffusion through the TiNi$_3$ takes place very rapidly, hydrogen is replenished from the storage material 1 to the extent to which the hydrogen is reacted on the surface 4. Due to the fact that the active material essentially is not in contact with the alkaline electrolyte 5 (e.g. 6 M KOH) except at point 3, the corrosive effect of the electrolyte on the active material 1 is also only minor. Finally, since the TiNi$_3$ has a sufficient elasticity characteristic, expansions and shrinkages of the active material do not result in a mechanical destruction of the electrode.

Of course, it is also important that the transition of the hydrogen from the storage material 1 into the TiNi$_3$ (2 in the drawing) is not impeded. This inhibition does not take place, in particular, if Ni-Ti alloy phases from the range of Ti$_2$Ni to TiNi (i.e. alloys having compositions with titanium rich content) are utilized as the storage material 1 of the electrode. In this case, it is possible, by the use of suitable steps during the manufacture of the electrode, for example pressure-mixing of the alloy active material with the TiNi$_3$ powder (DAS 1,421,355) and/or hot-pressing of the mixed materials, to bond these materials firmly together by welding action, so that the hydrogen diffusion can proceed without inhibition. The pressure-mixing step is a conventional mode of operation, wherein a rotating grinding or mixing element is effective on the components to be mixed under high pressure. The principle of operation is essentially based on the so-called "Hollander" blender known from the paper industry. The pressure-mixing proves to be especially advantageous in this connection, because oxide layers on the grains are torn up thereby and the materials to be mixed are thus brought into direct contact over a large area; consequently advantageous conditions are also created for a possible bond formation.

Another basic possibility for the construction of the electrode according to the present invention is shown in FIG. 2. A powder is utilized as the starting point for the manufacture of the electrode, the grains of this powder consisting of a hydrogen-storing material 1, (e.g. Ti$_2$Ni or TiNi) and being coated by a TiNi$_3$ layer. Grains of this structure are known (Swiss Pat. No. 407,264), and powder consisting of these grains can be pressed, for example, into electrodes in accordance with the usual techniques. These electrodes—as can be seen from the schematic view of FIG. 2—are not compact, as the electrode discussed above, but rather have a porous structure.

These above-described possibilities of constructing the electrodes make it apparent that the corrosion of the storage material, which impairs the electrode life, cannot occur, because only the TiNi$_3$, which corrodes only to a very minor extent, is in contact with the alkaline medium or electrolyte.

The production of such an electrode can be accomplished as described by way of examples hereinbelow:

EXAMPLE I

A mixture of 50 g. of titanium sponge and 50 g. of pulverized Ni (granular size 5–50$\mu$) is pressed with 4 tons/cm$^2$ into tablets and sintered for 3 hours under a hydrogen atmosphere at 850°C. After cooling under vacuum, the thus-obtained sintered element having the composition of Ti$_{1.17}$NiH$_x$ (wherein $x$=0.5 to 1.5) is comminuted and screened or sifted. The powder product containing particles of a grain size of 50 $\mu$ is further processed. 100 g. of the Ti$_{1.17}$NiH$_x$ powder is carefully mixed (under normal pressure) with 25 g. of TiNi$_3$ powder (5$\mu$), obtained by comminuting a melt-produced element of the aforementioned composition under a protective gas atmosphere i.e. argon, and 30 g. of the mixture is compacted in a press mold to a crude electrode of about 7×7 cm$^2$, having a thickness of about 1.2 mm. The compression pressure is 6 tons/cm$^2$. The molded article is then hot-pressed for 30 seconds with 6 tons/cm$^2$ at 400°–600°C. under a protective gas atmosphere of argon. By this procedure the main amount of hydrogen is desorbed from the material. After a rapid cooling step, the electrode which still contains small amounts of hydrogen is ready for use.

A first charging of the electrode with hydrogen takes place in an alkaline electrolyte of 6 M KOH by a cathodic current of about 5 milliamperes/cm$^2$. The potential of the electrode rises during this step from about 810 millivolts (measured against the Hg/HgO electrode) to about −930 mV. After reaching this potential, the electrode is charged. During discharging to −700mV, a capacity can be derived from the electrode corresponding to a value of 210 amp.hr./kg.

As a variation, to provide an improved current delivery of the electrode and to increase its mechanical stability, it is possible to include in the press-molding operation a current conductor—preferably expanded copper or nickel.

EXAMPLE II

In this example, 100 g. of a Ti$_{1.17}$NiH$_x$ powder (see Example I) is mixed with 30 g. of TiNi$_3$ powder, particle size 5$\mu$. The mixing is effected under mechanical pressure. For this purpose, the powder mixture is charged into a rotating vessel wherein, during the mixing under a protective gas atmosphere (argon), the powder is simultaneously forced through a roller-like device. The pressure is set so that the TiNi$_3$ particles are plastically deformed. After mixing for one hour, a molded article is pressed from 30 g. of the mixture. The further treatment takes place as described in Example I.

After charging, an electrode results having a capacity of 200 amp.hr./kg.

EXAMPLE III

In order to produce a porous electrode, Ti$_{1.17}$NiH$_x$ ($x$=0.5 to 1.5) powder having a particle size of 100$\mu$ is used, the particles of which were coated with a nickel layer of a thickness of 1 to 5$\mu$ by means of the Sherritt-Gordon process, which is one of the customary currentless nickel-plating processes, or by reaction with nickel carbonyl at 300°C up to 5 percent Ni by weight, (also another nickel-plating process may be used). 25 grams of the powder obtained are compacted under 0.5 ton/cm$^2$ in a press mold to form a solid body of 70 mm.×70 mm.×1.2 cm. The pressed article is thereafter brought to a temperature of 600°–800°C. under argon within one minute and maintained at this temperature for 5 minutes. By this operation, the desired TiNi$_3$ layer is produced. After rapid cooling, the electrode is ready for use. The capacity thereof is about 200 amp.hr./kg.

It will be understood that as the protective gas, nitrogen, which could react must not be used, but rather a nonreactive gas, preferably a noble gas, e.g. argon or helium, is used.

EXAMPLE IV

In this example, 100 g of LaNi$_5$, particle size 1–30$\mu$, is mixed with 25 g of TiNi$_3$ powder, particle size 4–10$\mu$. LaNi$_5$ is produced, e.g. by arc-melting. The La may be of a purity grade of 95 percent by weight. The mixing is effected under mechanical pressure (see Example II). After mixing, a molded article is pressed from 30 g. of the mixture. The molded article is then hot-pressed as in Example I. By this procedure, the main amount of hydrogen desorbes from the sample. After cooling, the electrode is ready for use.

While the novel principles of the invention have been described, it will be understood that various omissions, modifications and changes in these principles may be made by one skilled in the art without departing from the spirit and scope of the invention.

What we claim is:

1. A hydrogen storage electrode comprising a body formed of particles of an active, hydrogen-storing material, said particles being enveloped by and in surface contact with TiNi$_3$ which is inactive with respect to the hydrogen storage but has a high hydrogen permeation.

2. The electrode according to claim 1, wherein said particles of active, hydrogen-storing material have a size of from 5 to 100$\mu$ and TiNi$_3$ having a particle size of 1–500$\mu$, is used to form said body.

3. The electrode according to claim 2, wherein the TiNi$_3$ particles have a size up to 80$\mu$.

4. The electrode according to claim 1, wherein the active material having a high hydrogen storage ability is a TiNi alloy having a titanium content in the range from the phase Ti$_2$Ni to TiNi with a particle size of from 5 to 500$\mu$.

5. The electrode according to claim 4, wherein the TiNi alloy has a particle size up to 100$\mu$.

6. The electrode according to claim 1, wherein the active material having a high hydrogen storage ability, comprises lanthanum alloys.

7. The electrode according to claim 6, wherein the lanthanum alloys include LaCo$_5$ and LaNi$_5$.

8. The electrode according to claim 1, wherein grains of the active material are coated with a nickel layer having a thickness of 1–10 $\mu$.

9. The electrode according to claim 1, wherein an expanded copper metal is provided in the electrode as the current conductor and as an additional strengthening means.

10. A process for the production of the hydrogen storage electrode which comprises coating particles of a powder of a hydrogen-storing active material with a layer of TiNi$_3$ and forming the resulting coated powder into an electrode.

11. The process according to claim 10, wherein active material and the TiNi$_3$ are mixed in a weight ratio of 1:0.05 to 1:1.2,, preferably 1:0.25, and pressed into a molded article, and are therafter compacted by hot pressing.

12. The process according to claim 10, wherein the active material and the TiNi$_3$ are mixed in a weight ratio of 1:0.05 to 1.2, preferably 1:0.25, under mechanical pressure during a period of 15 to 150 minutes and pressed into a molded article, and are thereafter compacted by hot pressing.

13. The process according to claim 11, wherein the initial pressing step is conducted under a pressure of 0.5 to 10 tons/cm$^2$ and preferably a pressure of 6 tons/cm$^2$.

14. The process according to claim 11, wherein the hot pressing step takes place under an inert gas and with 2–8 tons/cm$^2$ at a temperature of 350°–600° C. during a period of 0.1–20 minutes, preferably 5 minutes.

15. The process according to claim 10, wherein the particles of the active material are coated with a nickel layer deposited by the thermal dissociation of nickel carbonyl in the presence of inert gases onto the particles of the active material.

16. The process according to claim 12, wherein the coated active material is pressed into a molded article, and then maintained at a temperature of 600°–900° C. during a time period of 1 to 30 minutes, preferably 5 minutes.

17. In a galvanic cell having a hydrogen storage electrode with an alkaline electrolyte, the improvement which comprises a hydrogen storage electrode comprising a body formed of particles of an active hydrogen-storing material, said particles being enveloped by and in surface contact with TiNi$_3$.

* * * * *